UNITED STATES PATENT OFFICE.

WILLIAM HEICK, OF SAN FRANCISCO, CAL., ASSIGNOR, BY MESNE ASSIGNMENT, TO THE THUNDER POWDER COMPANY, OF SAME PLACE.

EXPLOSIVE COMPOUND.

SPECIFICATION forming part of Letters Patent No. 235,871, dated December 28, 1880.

Application filed April 3, 1880. (Specimens.)

*To all whom it may concern:*

Be it known that I, WILLIAM HEICK, of the city and county of San Francisco, and State of California, have invented a new Explosive Compound; and I do hereby declare the following to be a full description thereof.

My invention relates to an improved compound to be used as an explosive for blasting and other purposes; and it consists in a mixture of honey and glycerine, prepared and treated as hereinafter fully described, as an explosive, with other ingredients, forming a compound having absorbing, explosive, and neutralizing qualities, as hereinafter fully described and set forth.

In employing the compound of honey and glycerine as an explosive agent, and combining it with the absorbents hereinafter mentioned, I have overcome the chief objections against the employment of all nitro-glycerine explosives, to wit: first, that of being made dangerous and non-explosive under a certain temperature, to wit, 44° Fahrenheit; second, the danger which attends the handling of nitro-glycerine compounds where the explosive exudes through a too high temperature.

I intend to establish two (2) grades, to be designated as No. 1 and No. 2, and give the different substances and the proportions in which I employ them, as follows:

No. 1.

| | |
|---|---|
| Honey and glycerine compound | 50 parts. |
| Chlorate of potash | 12 " |
| Nitrate of potash | 16 " |
| Prepared sawdust | 17 " |
| Prepared chalk | 5 " |
| | 100 parts. |

No. 2.

| | |
|---|---|
| Honey and glycerine compound | 38 parts. |
| Chlorate of potash | 19 " |
| Nitrate of potash | 24 " |
| Prepared sawdust | 10 " |
| Prepared chalk | 9 " |
| | 100 parts. |

The honey and glycerine compound is made as follows: I take one part of nitric acid (specific gravity 1.50) and two parts of sulphuric acid, (specific gravity 1.84,) mix them, and let the mixture stand until it has cooled down to 62½° Fahrenheit. When at this temperature I add, to eight parts of mixed acid deposited in a wooden tank lined with lead, very slowly and under constant stirring, one part of a thickly liquid mixture consisting of equal parts, by weight, of strained honey and glycerine, keeping the temperature, which the addition of the liquid with the acids will cause to rise, down to about 60° or 70° Fahrenheit, through an ice-cold stream of water running through a lead pipe placed inside the mixing-tank. When I have added all the honey mixture I continue stirring for about five minutes, after which time the honey and glycerine compound will settle to the bottom. To separate it from adhering acid I draw off the liquid, through a lead pipe inserted in the bottom of the tank, into another tank containing about five times the weight of the liquid of pure water, constantly stirring it with a wooden rod. I let it stand quietly for a few minutes, take off the overstanding acid liquid, and, after repeating this washing process with renewed portions of water, I lastly wash the honey and glycerine compound with a solution of carbonate of soda until all traces of acid are neutralized. It is now ready for mixing it with the ingredients above described, which, however, must beforehand be thoroughly mixed and uniformly powdered.

The sawdust used is prepared by boiling common red-wood sawdust, properly graded through a sieve, in a solution of carbonate of soda, until all resinous and coloring matter is extracted, after which it is thoroughly cleaned in cold water, and then properly dried.

I am aware that compounds composed of stearic oil and honey have been treated with nitric and sulphuric acids and mixed with sawdust, nitrate and chlorate of potash, and other substances; but

What I claim, and desire to secure by Letters Patent, is—

An explosive compound composed of honey and glycerine treated with nitric and sulphuric acid, as hereinbefore described, chlorate of potash, nitrate of potash, prepared sawdust, and prepared chalk, substantially in the manner described.

In testimony that I claim the foregoing I have hereunto set my hand and seal this 20th day of March, 1880.

WILLIAM HEICK. [L. S.]

Witnesses:
HOLLAND SMITH,
WILLIAM P. COLEMAN.